(12) United States Patent
Kim et al.

(10) Patent No.: US 7,649,594 B2
(45) Date of Patent: Jan. 19, 2010

(54) PHOTO-LUMINESCENT LIQUID CRYSTAL DISPLAY

(75) Inventors: Byung-ki Kim, Gunpo-si (KR); Seoung-jae Im, Seoul (KR); Jae-young Choi, Suwon-si (KR); Eun-sung Lee, Yongin-si (KR); Eun-joo Jang, Daejeon-si (KR); Jae-hee Cho, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 651 days.

(21) Appl. No.: 11/410,621

(22) Filed: Apr. 25, 2006

(65) Prior Publication Data

US 2007/0007881 A1     Jan. 11, 2007

(30) Foreign Application Priority Data

Apr. 29, 2005   (KR)   .................. 10-2005-0036067

(51) Int. Cl.
*G02F 1/1335* (2006.01)
(52) U.S. Cl. .............................. 349/71; 349/61; 349/69; 349/70
(58) Field of Classification Search ................. 349/61, 349/69, 70, 71
See application file for complete search history.

(56) References Cited

U.S. PATENT DOCUMENTS

| 4,822,144 | A | * | 4/1989 | Vriens ......................... 349/71 |
| 4,830,469 | A | | 5/1989 | Breddels et al. |
| 5,882,779 | A | * | 3/1999 | Lawandy .................... 428/323 |
| 6,391,462 | B1 | * | 5/2002 | Jang .......................... 428/432 |
| 6,872,766 | B2 | * | 3/2005 | Schunk et al. .............. 524/357 |
| 2003/0214616 | A1 | * | 11/2003 | Komoto et al. ................ 349/96 |

* cited by examiner

*Primary Examiner*—Michael H Caley
(74) *Attorney, Agent, or Firm*—Cantor Colburn LLP (57) ABSTRACT

A photo-luminescent liquid crystal display (PL LCD) includes: a light control unit which includes a liquid crystal (LC) layer modulating the UV light and electrodes driving the LC layer; and a light emitting layer which emits light by the UV light transmitted through the light control unit. The light emitting layer includes inorganic phosphors and semiconductor quantum dots (QDs) having a quantum confinement effect. The PL LCD includes adding QDs having a high quantum efficiency into luminescent substances having lower light utilization efficiency than other colors, for example, red phosphor having very low quantum efficiency to improve the light utilization efficiency, thereby improving the color balance.

17 Claims, 9 Drawing Sheets

PHOTO-LUMINESCENT LIQUID CRYSTAL DISPLAY

This application claims priority to Korean Patent Application No. 10-2005-0036067, filed on Apr. 29, 2005, and all the benefits accruing therefrom under 35 U.S.C. §119, and the contents of which in its entirety are herein incorporated by reference.

BACKGROUND OF THE INVENTION

1. Field of the Invention

The present invention relates to a liquid crystal display ("LCD"), and more particularly, to a photo-luminescent ("PL")-LCD having improved light utilization efficiency, pixel-to-pixel luminance uniformity and color balance.

2. Description of the Related Art

LCDs are non-emissive displays that require a separate backlight device and Red ("R"), Green ("G") and Blue ("B") color filters for pixels to display a color image on a screen.

The R, G and B color filters separate white light emitted from the backlight device into red, green and blue lights, respectively. The R, G and B color filters each transmit only light of a specific wavelength, resulting in significant optical loss. Thus, a high luminance backlight device is required to produce an image with sufficient luminance.

U.S. Pat. Nos. 4,822,144 and 4,830,469 disclose PL LCDs using phosphors excited by ultraviolet ("UV") light and having higher light utilization efficiency than LCDs using color filters. The UV light used in the PL LCD is near visible UV light and is generated from UV light activated phosphors, which are different from electron beam activated phosphors used in conventional cathode-ray tubes ("CRT").

The PL LCD should use UV light with a long wavelength, which is absorbed less in the liquid crystal. However, red phosphors among phosphors excited by UV light with a long wavelength have lower light utilization efficiency than blue and green phosphors. Accordingly, conventional PL LCDs using UV light with a long wavelength have a pixel-to-pixel luminance difference and an inferior color balance caused by the pixel-to-pixel luminance difference. Accordingly, improving the pixel-to-pixel luminance difference and the inferior color balance are desired.

BRIEF SUMMARY OF THE INVENTION

Exemplary embodiments of the present invention provide a photo-luminescent liquid crystal display ("PL LCD") having a simple structure and reduced pixel-to-pixel luminance difference.

Exemplary embodiments of the present invention also provide a PL LCD, which displays images of high quality by preventing the degradation of contrast ratio due to ambient light.

According to an exemplary embodiment of the present invention, a photo-luminescent liquid crystal display (PC LCD) includes: a UV backlight unit generating ultraviolet (UV) light; a light control unit which includes a liquid crystal ("LC") layer modulating the UV light and electrodes driving the LC layer; and a light emitting layer which emits light by the UV light transmitted through the light control unit and includes UV inorganic phosphors and PL quantum dots ("QDs") having a quantum confinement effect.

The light control unit may include a plurality of pixel regions, wherein the light emitting layer comprises light emitting layer units corresponding to each of the pixel regions.

The light emitting layer units may respectively include green light emitting layers, red light emitting layers and blue light emitting layers corresponding to each of the pixel regions, and the red light emitting layers may include the QDs.

The red light emitting layers may be formed of a mixture of red phosphors and the QDs.

The red light emitting layer may have a stacked structure of a separate red phosphor layer and a QD layer, and the QD layer may be disposed closer to the UV backlight unit than the phosphor layer.

The PC LCD may further include: a front plate and a rear plate having the LC layer therebetween, wherein the light emitting layer is disposed between the front plate and the LC layer or on an outer surface of the front plate.

The PC LCD may further include: a protection substrate formed on the light emitting layer; and a UV filter which blocks external UV light and is disposed on the protection substrate.

The PC LCD may further include: an UV filter which blocks external UV light and is disposed on the outer surface of the front plate which the light emitting layer is disposed under.

The UV filter may include a chemical blocking agent absorbing UV light or a physical blocking agent reflecting and scattering incident UV light.

The chemical blocking agent may be para-aminobenzoic acid ("PABA") derivatives, cinnamate derivatives, salicylic acid derivatives, benzophenone and its derivatives, and antharanilate and its derivatives.

The physical blocking agent may be one of zinc oxide, titanium oxide, iron oxide or magnesium oxide.

Materials used for green, blue and red inorganic phosphors are not limited in the present invention and commonly known materials can be used.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, lengths and sizes of layers and regions may be exaggerated for clarity.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "below" or "lower" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Quantum dots (QDs) or nano dots ("NDs") and inorganic phosphors used in the present invention will be described before the description of a photo-luminescent liquid crystal display (PL LCD).

QDs are semiconductor particles having a predetermined size and showing a quantum confinement effect. The diameter of the QDs are in a range from about 1 nm to about 10 nm. Light of a desired wavelength can be obtained by controlling the sizes of the QDs.

Light having various wavelengths can be obtained from the QDs according to quantum size effect, that is, various colors including red, green and blue can be easily obtained according to the size of the QD. Accordingly, a light emitting device ("LED") emitting light with a specific wavelength can be manufactured to obtain various lights including white light using a combination of QDs.

QDs may be synthesized by a wet chemistry method or a vapor deposition method. The wet chemistry method is a commonly known technique that allows particles to grow by mixing precursor materials in an organic solvent. For example, QDs may be formed of a II-VI compound such as cadmium selenide (CdSe), cadmium telluride (CdTe), cadmium sulfide (CdS), zinc selenide (ZnSe), zinc telluride (ZnTe), zinc sulfide (ZnS), mercury telluride (HgTe), or mercury sulfide (HgS).

QDs may have a core-shell structure in which the core includes one compound selected from the group consisting of CdSe, CdTe, CdS, ZnSe, ZnTe, ZnS, HgTe, and HgS and the shell includes one compound selected from the group consisting of CdSe, CdTe, CdS, ZnSe, ZnTe, ZnS, HgTe, and HgS. QDs may also be formed of a III-V compound such as gallium nitride (GaN), indium phosphide (InP), indium arsenic (InAs), gallium arsenic (GaAs), gallium phosphide (GaP), and gallium indium phosphide (GaInP).

The inorganic phosphor used in the PL LCD according to the exemplary embodiments of the present invention can be formed of commonly known materials.

The green phosphor may be at least one selected from the group consisting of $YBO_3:Ce^{3+},Tb^{3+}$; $BaMgAl_{10}O_{17}:Eu^{2+}, Mn^{2+}$; $(Sr,Ca,Ba)(Al,Ga)_2S_4:Eu^{2+}$; $ZnS:Cu,Al$; $Ca_8Mg(SiO_4)_4Cl_2:Eu^{2+},Mn^{2+}$; $Ba_2SiO_4:Eu^{2+}$; $(Ba,Sr)_2SiO_4:Eu^{2+}$; $Ba_2(Mg,Zn)Si_2O_7:Eu^{2+}$; and $(Ba,Sr)Al_2O_4:Eu^{2+}$; $Sr_2Si_3O_{8.2}SrCl_2:Eu^{2+}$. The blue phosphor may be at least one selected from the group consisting of $(Sr,Mg,Ca)_{10}$ $(PO_4)_6Cl_2:Eu^{2+}$; $BaMgAl_{10}O_{17}:Eu^{2+}$; and $BaMg_2Al_{16}O_{27}:Eu^{2+}$. The red phosphor may be at least one selected from the group consisting of $(Sr,Ca,Ba,Mg)P_2O_7:Eu^{2+}$, $Mn^{2+}$; $CaLa_2S_4:Ce^{3+}$; $SrY_2S_4:Eu^{2+}$; $(Ca,Sr)S:Eu^{2+}$; $SrS:Eu^{2+}$; $Y_2O_3:Eu^{3+}$, $Bi^{3+}$; $YVO_4:Eu^{3+}$, $Bi^{3+}$; $Y_2O_2S:Eu^{3+},Bi^{3+}$; and $Y_2O_2S:Eu^{3+}$.

Figure 1:
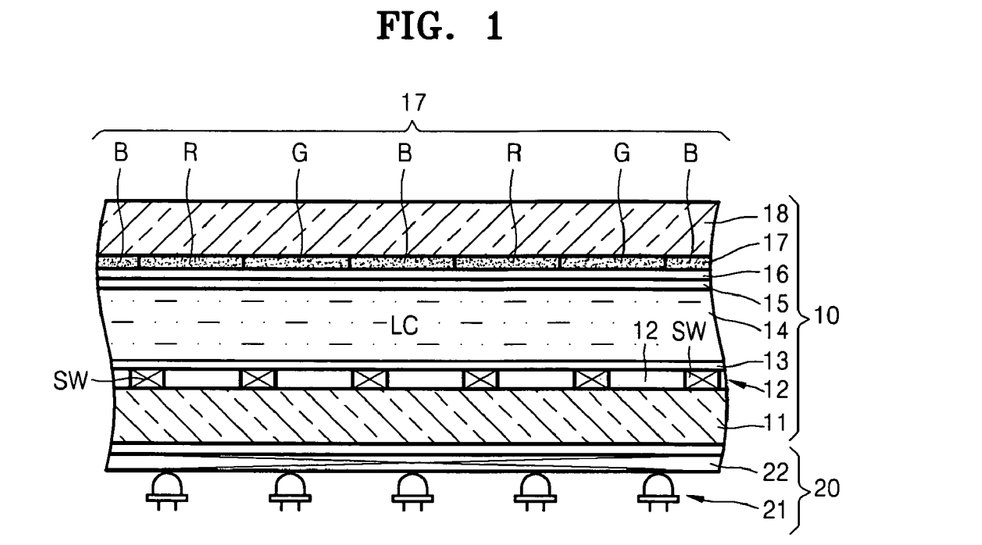
FIG. 1 is a cross-sectional view of an exemplary embodiment of a liquid crystal display (LCD) according to the present invention.

Referring to FIG. 1, an exemplary embodiment of an LCD according to the present invention includes a display panel 10 and an UV backlight unit 20.

The UV backlight unit 20 is formed of UV light emitting devices, which emit light having a wavelength of, for example, about 360 nm to about 460 nm. The display panel 10 includes a front plate 18 and a rear plate 11 which are disposed at a predetermined distance from each other, and a liquid crystal (LC) layer 14 disposed between the front plate 18 and the rear plate 11.

A light emitting layer 17 including red light emitting layers (R), green light emitting layers (G) and blue light emitting layers (B), a common electrode 16, and an upper alignment layer 15 are sequentially formed on the inner surface of the front plate 18. Thin film transistor ("TFT") switching elements SW and pixel electrodes 12 are formed as a liquid crystal driving circuit, and a lower orientation layer 13 is formed on the TFT switching elements SW and the pixel electrodes 12. The TFT switching elements SW, the pixel electrodes 12 and the lower orientation layer 13 are disposed on the inner surface of the rear plate 11. Polarizers (not illustrated) are disposed between the light emitting layer 17 and the common electrode 16 in consideration of a UV light transmitting direction. The light emitting layer 17 includes QD particles or a QD thin film. The QD particles or the QD thin film may be disposed at least in the red light emitting layer (R) having the lowest light utilization efficiency, which will be described later in detail.

A UV filter (19 in FIG. 5) is optionally formed on the outside of the front plate 18. The UV filter 19 includes a chemical blocking agent absorbing UV light or a physical blocking agent reflecting and scattering incident UV light, which will be described later in detail.

The UV backlight unit 20 facing the rear plate 11 includes UV light lamps 21 and a light guide/diffusion member 22, as described below. The UV light lamps 21 are above-described UV LEDs or mercury lamps. The light guide/diffusion member 22 guides UV light emitted from the UV light lamps 21 toward the rear plate 11 and diffuses the UV light uniformly.

The light guide/diffusion member 22 is optionally installed and the UV light lamps 21 may be arranged on the entire surface of the rear plate 11. For example, when the UV light lamps are LEDs, a plurality of LEDs are 2-dimensionally and densely arranged. A light source supplying UV light onto the entire surface plane of an LCD is required for a large scale LCD.

Figure 2:
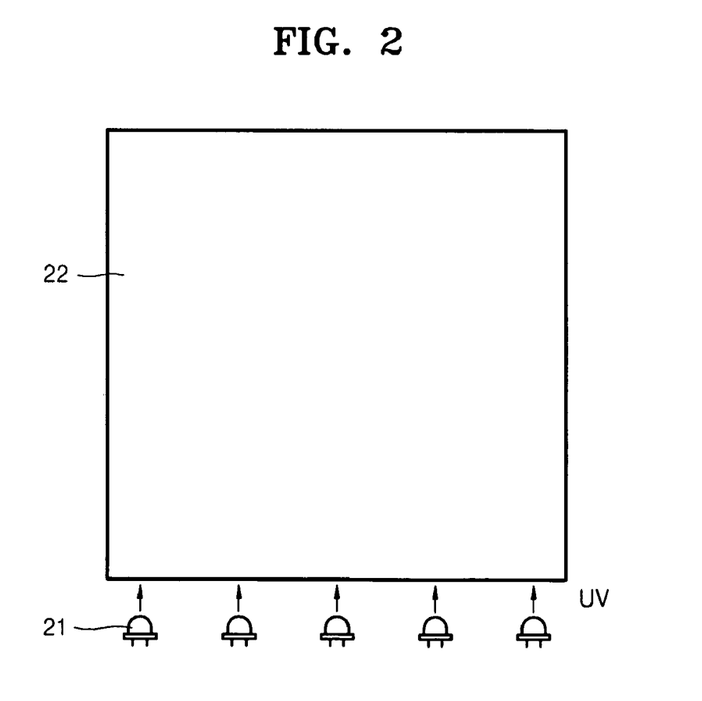
FIG. 2 illustrates an example of an exemplary embodiment of an UV backlight unit in the LCD of FIG. 1 according to the present invention.
Figure 3:
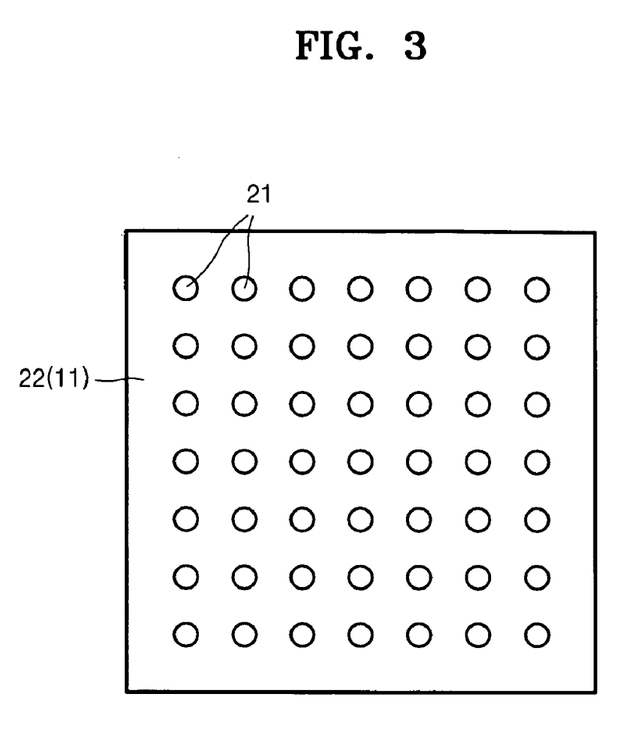
FIG. 3 illustrates another example of another exemplary embodiment of an UV backlight unit in the LCD of FIG. 1 according to the present invention.

When LEDs are used as the UV light lamps 21, the plurality of LED lamps may be arranged in parallel to each other at an edge of the light guide/diffusion member 22, that is, an edge lighting manner, as shown in FIG. 2. According to another exemplary embodiment of the present invention shown in FIG. 3, a plurality of LEDs may be arranged on the entire surface of a light guide/diffusion member 22 in the rear plate 11.

Figure 5:
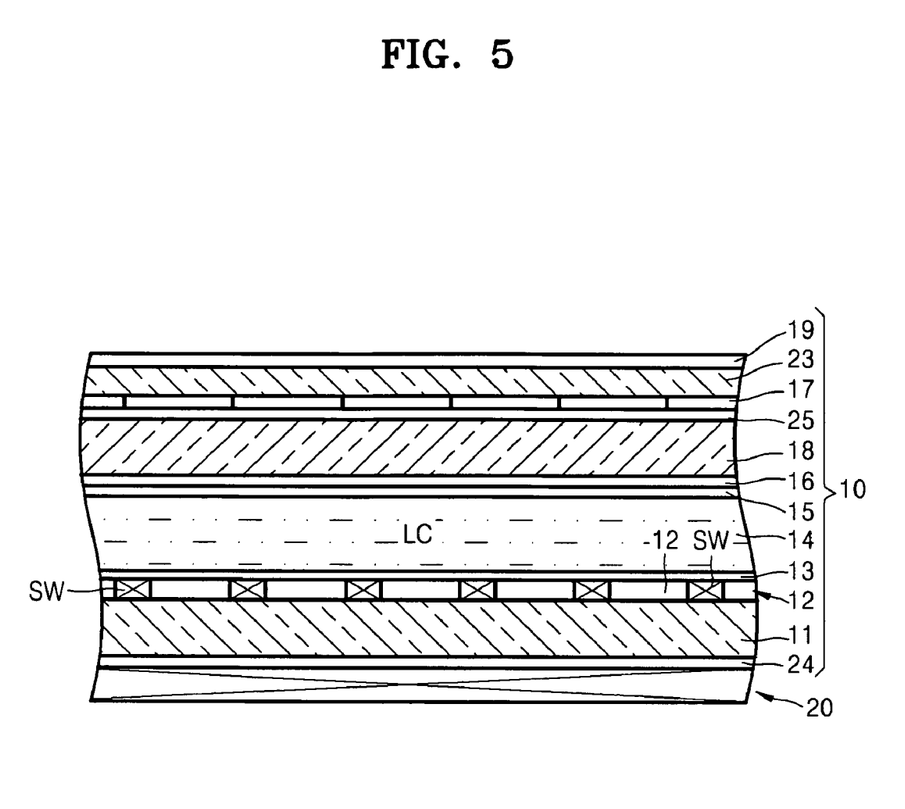
FIG. 5 is a cross-sectional view of another exemplary embodiment of an LCD according to the present invention.

FIG. 5 is a cross-sectional view of another exemplary embodiment of an LCD according to the present invention.

The positions of the light emitting layer 17 and the UV filter 19 in the LCDs of FIGS. 1 and 5 are different from each other. Referring to FIG. 5, the LCD includes a display panel 10 and a UV backlight unit 20.

The display panel 10 includes a front plate 18 and a rear plate 11, which are separated from each other at a predetermined distance, and a liquid crystal (LC) layer 14 is disposed between the front plate 18 and the rear plate 11.

A common electrode 16 and an upper orientation layer 15 are sequentially formed on the inner surface of the front plate 18. TFT switching elements SW and pixel electrodes 12 are formed on the inner surface of the rear plate 11. A lower orientation layer 13 is disposed on the TFT switching elements SW and the pixel electrodes 12.

Polarization plates 25 and 24 are disposed on outside surfaces of the front plate 18 and the rear plate 11, respectively. A light emitting layer 17, which emits a desired color light due to the UV light, is formed on the polarization plate 25. The light emitting layer 17 absorbs UV light having a wavelength ranging from about 360 nm to about 460 nm and emits a desired color light, as described above.

The light emitting layer 17 is covered by a protection substrate 23. An UV filter 19, which blocks UV light having a shorter wavelength than the light emitted from the light emitting layer 17, is formed on the surface of the protection substrate 23, as described above.

The UV filter 19 may include a chemical blocking agent absorbing UV light or a physical blocking agent reflecting and scattering incident UV light, as described above.

Figure 4:
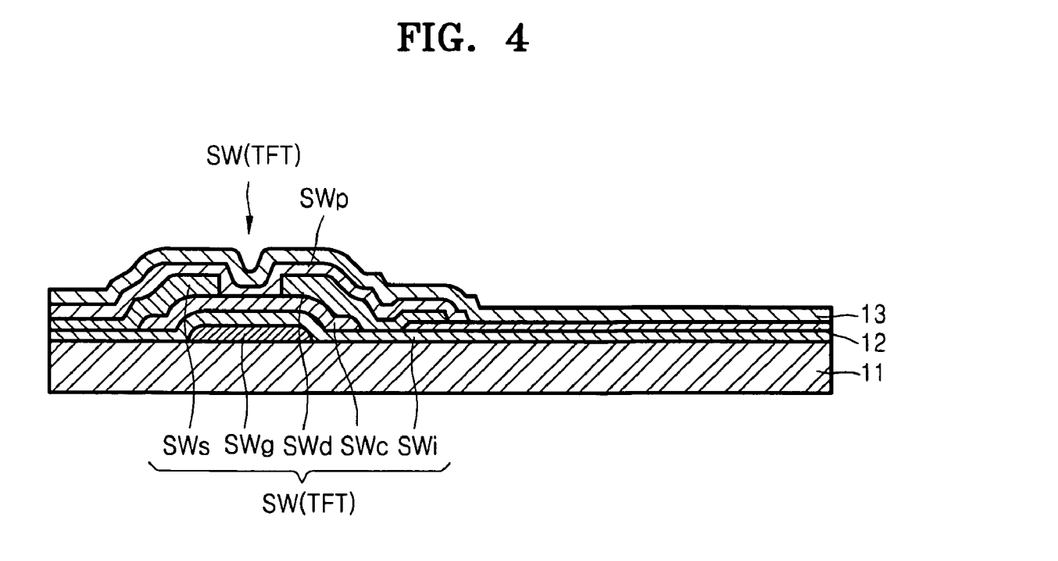
FIG. 4 is a cross-sectional view illustrating a structure of an exemplary embodiment of switching elements and pixel electrodes in the LCD of FIG. 1 according to the present invention.

FIG. 4 is a cross-sectional view showing a vertical structure of a TFT switching element SW (i.e., SW(TFT)) and a pixel electrode 12 connected to the switching element SW in the LCD. Referring to FIG. 4, the TFT has a bottom gate structure in which a gate SWg is disposed below a silicon channel SWc. More specifically, the gate SWg is formed on one side of a substrate 11 and a gate insulating layer SWi is formed over the substrate 11. The silicon channel SWc is formed on the gate insulating layer SWi immediately above the gate SWg. A transparent indium tin oxide (ITO) pixel electrode 12 is also formed on the gate insulating layer SWi and adjacent to the silicon channel SWc. A source SWs and a drain SWd are formed on either side of the silicon channel SWc and a passivation layer SWp is formed on the source SWs and the drain SWd. The drain SWd extends onto and is electrically connected to the pixel electrode 12. A lower orientation layer 13, which is in contact with the LC layer 14 (FIGS. 1 and 5) and aligns the LC layer 14 in a specific orientation, is formed on the TFT switching element SW and the pixel electrode 12.

Hereinafter, the QDs and the phosphor layers will be described in detail.

Light emission intensity of red, green and blue phosphors used in the LCD according to the present invention will be first described.

Figure 6:
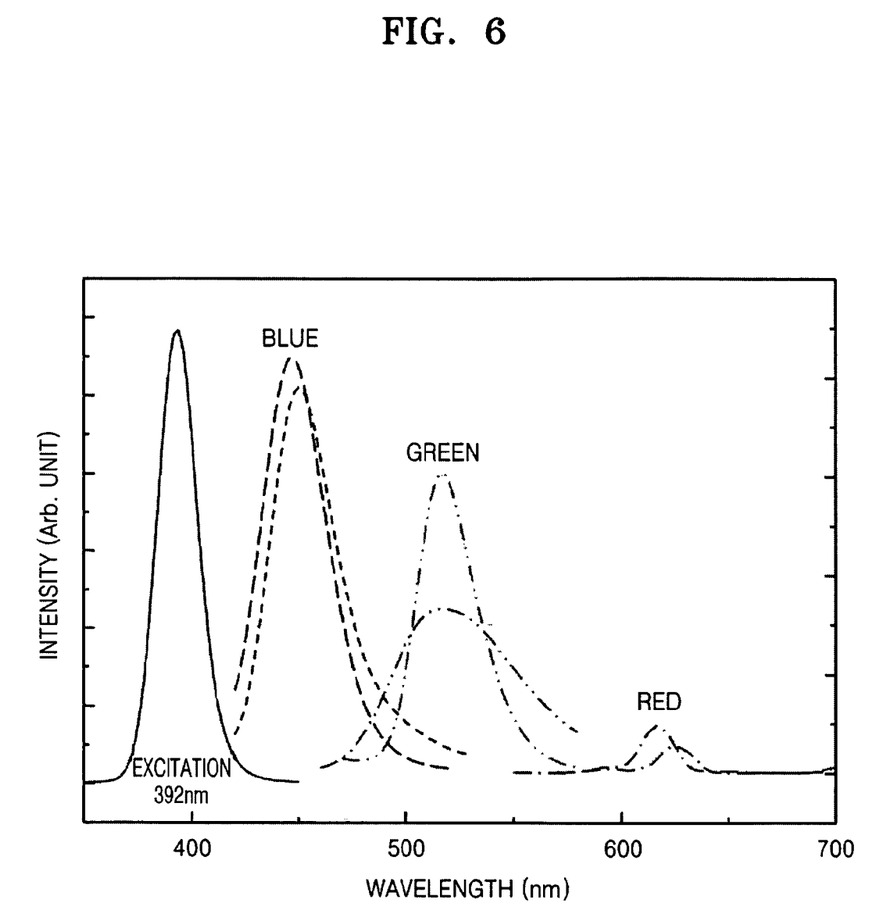
FIG. 6 is a graph of light emission intensities of UV light activated phosphors excited by external light.

FIG. 6 a graph showing emission intensity of phosphors excited by UV light having a wavelength of 392 nm. Phosphors available from two different manufacturers were used as conventional UV light activated phosphors for each color and a 392 nm LED was used as a light source.

Referring to FIG. 6, when ambient UV light having a wavelength of about 392 nm excited red, green and blue phosphors, two different kinds of blue phosphors emitted the blue lights with similar intensities. The two green phosphors available from different manufacturers respectively generated green lights with high and low intensities. The red phosphors emitted lights having very low intensities. This intensity difference can cause a color balance problem. To improve the color balance, the emission intensity of the red phosphors is increased by inserting QDs having high quantum efficiency (or light utilization efficiency) into the red phosphor, which has the lowest quantum efficiency.

Quantum efficiency values for red, green and blue phosphors are low, that is, about 0.3, 0.6, and 0.6, respectively. However, a quantum efficiency of QDs is very high, that is, about 0.8 to about 0.9. In the mixed phosphors, the intensity of the PL corresponds to the amount and quantum efficiency of QDs. The quantum efficiency values Qu and Qp for QDs and red phosphors are assumed to be 0.9 and 0.3, respectively, and an exemplary embodiment of a light emitting layer is formed by mixing red phosphor and QDs in order to absorb UV light with a ratio of about 0.6:0.4 according to the present invention. The quantum efficiency value Eu of the light emitting layer is 0.54 obtained from Equation 1 below.

$$Eu=(Qu*0.6+Qp*0.4) \quad (1)$$

Accordingly, the quantum efficiency of the current exemplary embodiment of a light emitting layer is 0.24 greater than that of a light emitting layer including only red phosphors. To obtain optimized quantum efficiency, an optical density OD defined by Equation 2 should be considered. Equation 2 is as follows:

$$OD=-\log T=\log(Io/I) \quad (2)$$

where "T" is transmittance of a QD, "Io" is the intensity of incident light, and "I" is the intensity of reflected light (or transmitted light).

Figure 7:
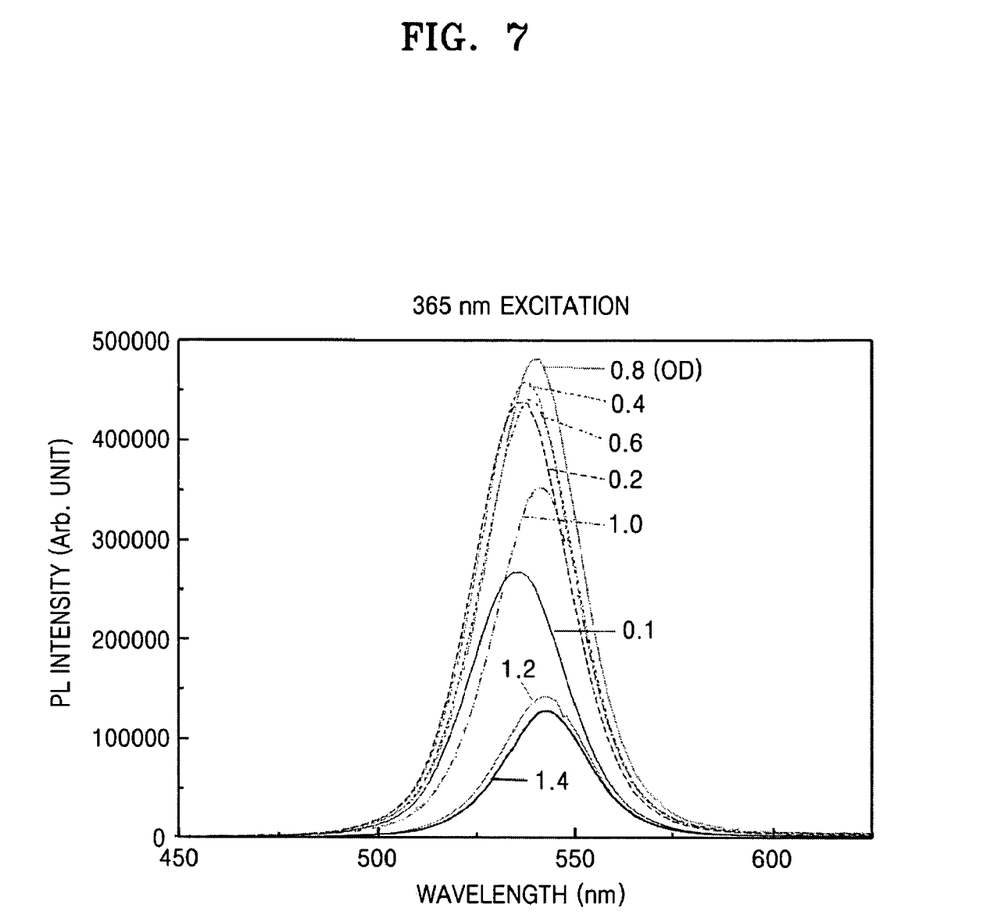
FIGS. 7 through 10 are graphs of PL intensities of exemplary embodiments of quantum dots (QDs), according to the present invention.
Figure 8:
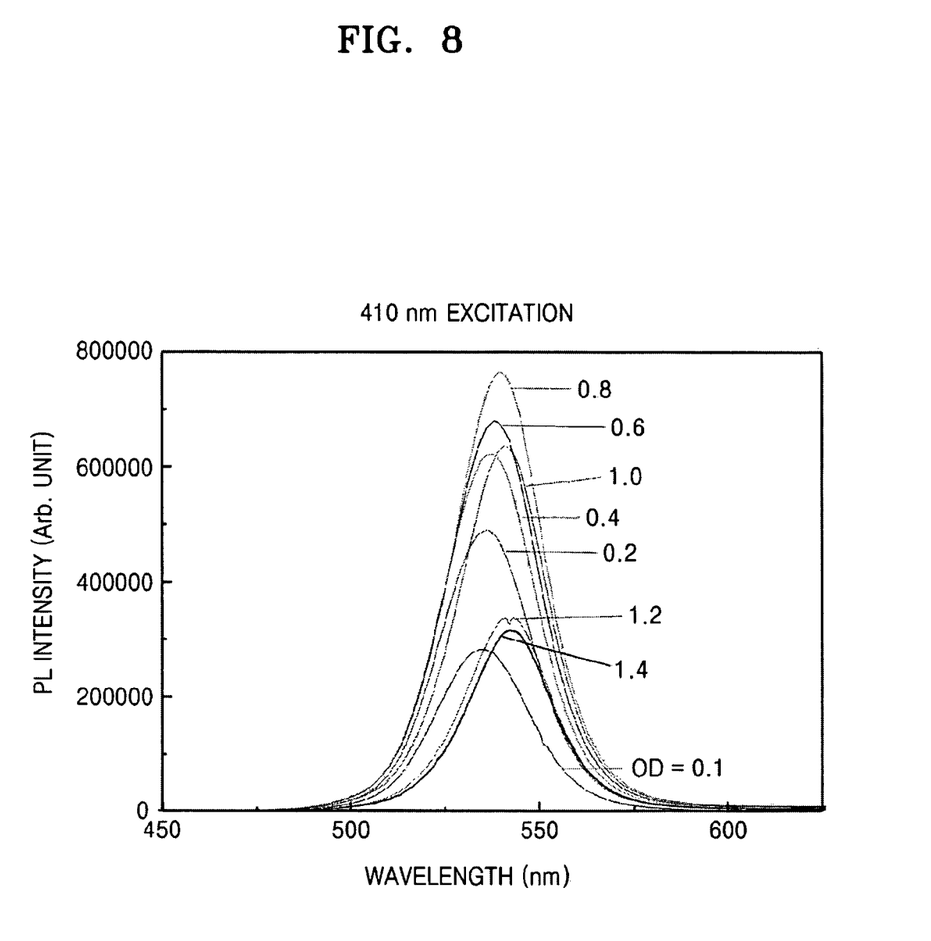

FIGS. 7 and 8 are graphs of a PL intensity of QDs excited by UV light having wavelengths of 365 nm and 410 nm, respectively, with respect to the change in a UV light optical density ("OD"). Referring to FIGS. 7 and 8, the PL intensity changes according to the OD, and has a maximum at about 0.8 of the OD.

Figure 9:
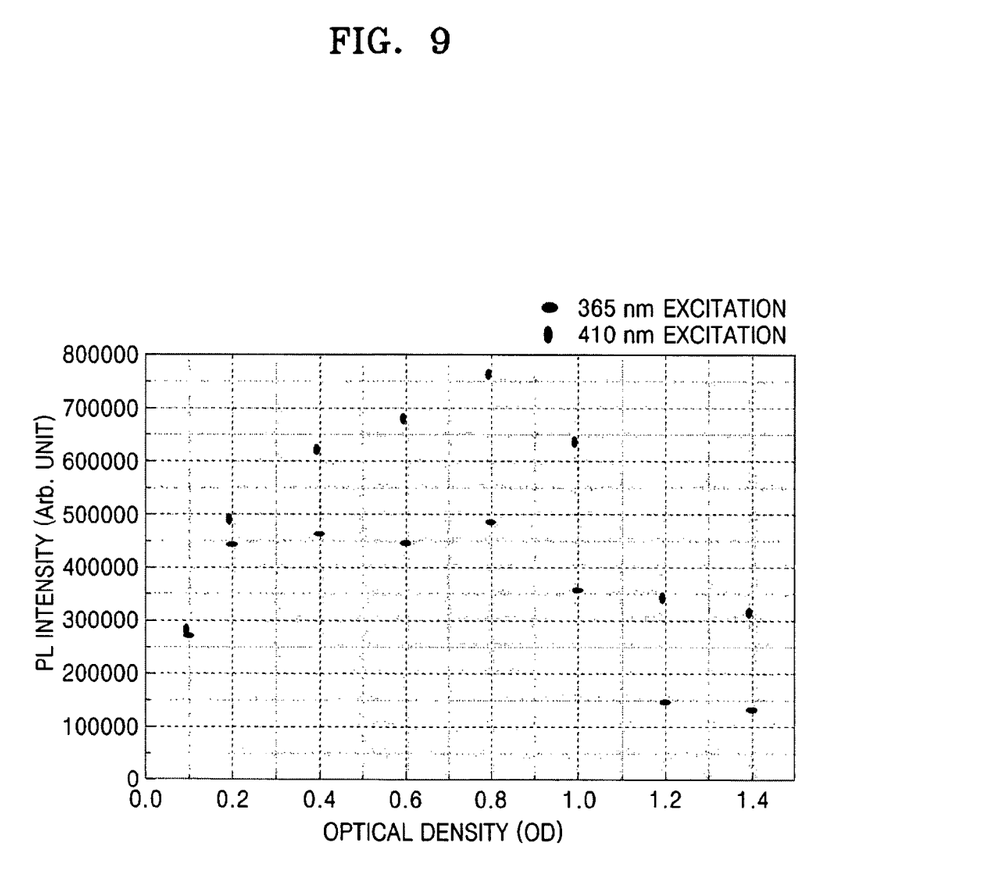
Figure 10:
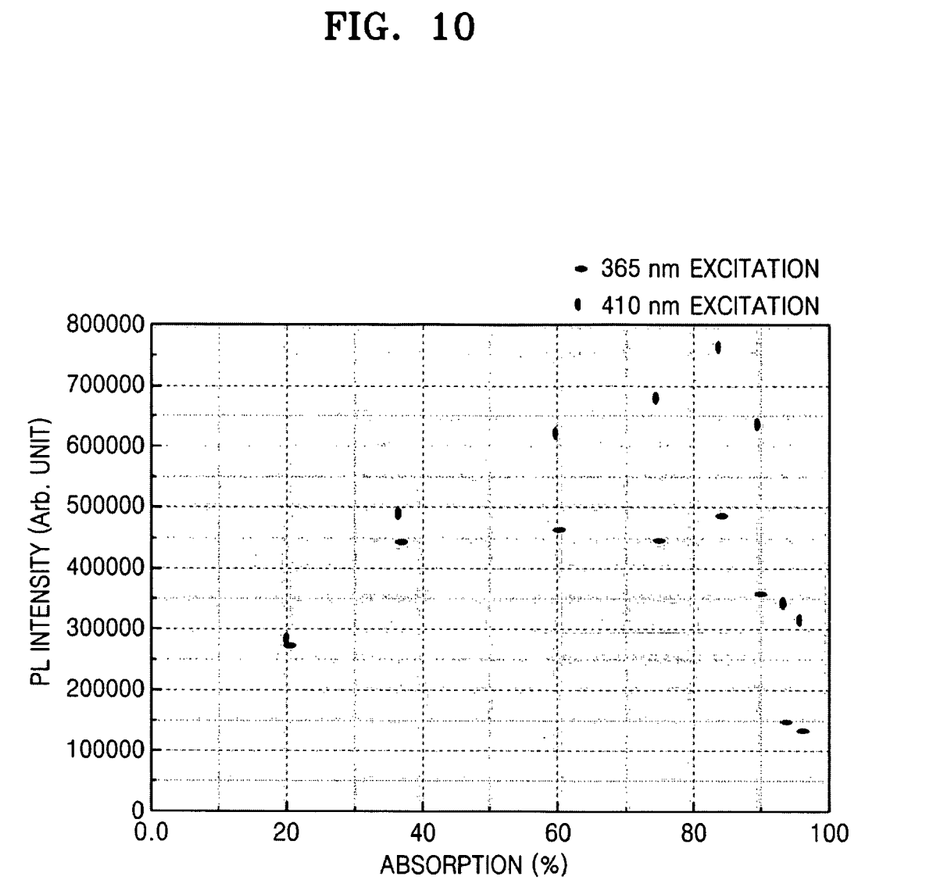

FIG. 9 is a graph of a PL intensity versus OD. FIG. 10 is a graph of PL intensity versus light absorption (%). Referring to FIGS. 9 and 10, the PI intensity increases until the OD and the absorption reach 0.2 and 50%, respectively. However, the increase rate of the PL intensity decreases at the QD amount when the UV light absorption is more than 50%, and the PL intensity decreases if QDs are further added.

That is, from the results of the PL intensity of the QDs, the PL intensity is not linearly proportional to the UV light absorption amount. When the OD is about 0.2, which indicates an absorption of 50%, if more QDs are added, the light utilization efficiency is reduced.

Accordingly, a thickness of the light emitting layer including the inorganic phosphors and QDs should be optimized considering the amount of QDs.

In the present invention, an LCD which has a light emitting layer including red, green and blue phosphor layers includes QD particles or a QD thin film in the red phosphor layer to increase the luminance of a red light emitting layer, thereby improving the color balance.

Figure 11:
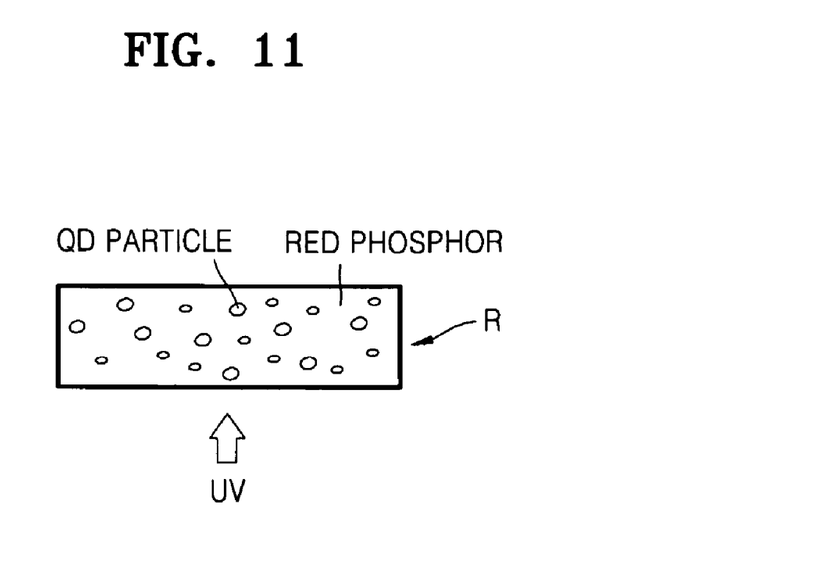
FIG. 11 is a cross-sectional view of an exemplary embodiment of a red light emitting layer in a PL LCD, according to the present invention.
Figure 12:
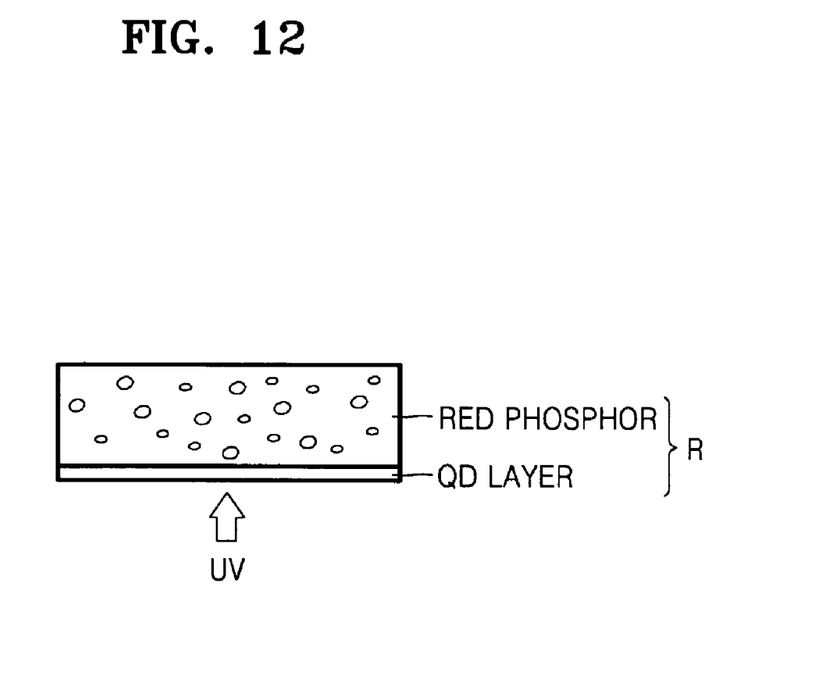
FIG. 12 is a cross-sectional view of another exemplary embodiment of a red light emitting layer in a PL LCD, according to the present invention.

In the present invention, the light emitting layer, in particular, the red light emitting layer R can be formed by mixing the red phosphors and the QD particles, as shown in FIG. 11, or by forming the QD thin film under the red phosphor layer, as shown in FIG. 12. The reason for forming the QD thin film under the red phosphor layer is that the light from the inorganic phosphors, which is lost light, can be absorbed and reemitted using a self absorption characteristic of the QDs, thereby enhancing the light utilization efficiency.

In the above-described exemplary embodiment, the improvement of the light utilization efficiency due to the addition of the QDs corresponding to a red phosphor is described, but QDs corresponding to other color luminescent substances can be included for improving the light utilization efficiency.

The QDs may be selected from the group consisting of a II-IV compound, a III-IV compound, a IV-VI compound, a Group IV compound, and a mixture of the compounds.

The II-VI compound may be selected from the group consisting of CdSe, CdTe, ZnS, ZnSe, ZnTe, ZnO, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HggZnTe, CdZnSeS, CdZnSeTe, CdZnSTe, CdHgSeS, CdHgSeTe, CdHgSTe, HgZnSeS, HgZnSeTe and HgZnSTe.

The III-V compound may be selected from the group consisting of GaN, GaP, GaAs, GaSb, AlN, AlP, AlAs, AlSb, InN, InP, InAs, InSb, GaNP, GaNAs, GaNSb, GaPAs, GaPSb, AlNP, AlNAs, AlNSb, AlPAs, AlPSb, InNP, InNAs, InNSb, InPAs, InPSb, GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs and InAlPSb.

The IV-VI compound may be selected from the group consisting of SnS, SnSe, SnTe, PbS, PbSe, PbTe, SnSeS, SnSeTe, SnSTe, PbSeS, PbSeTe, PbSTe, SnPbS, SnPbSe, SnPbTe, SnPbSSe, SnPbSeTe and SnPbSTe.

In addition, the Group IV compound may be selected from the group consisting of Si, Ge, SiC and SiGe.

Hereinafter, the above-described UV filter 19 of FIG. 5 and the contrast improvement due to the UV filter 19 will be described.

The UV filter 19 may include a chemical blocking agent absorbing UV light, such as para-aminobenzoic acid (PABA) derivatives, cinnamate derivatives, salicylic acid derivatives, benzophenone and its derivatives or antharanilate and its derivatives, or a physical blocking agent, such as zinc oxide, titanium dioxide, iron oxide or magnesium oxide. The UV filter 19 blocks the light emitting layer 17 from external UV light, which unnecessarily excites the light emitting layer 17 to emit light. As shown in FIG. 6, the phosphors are excited by an external UV light. The blue and green phosphors emit light of greater intensities than red phosphors, thereby degrading contrast ratio and color balance.

Considering such a light emission, when ambient light has a very high intensity, the PL LCD emits light on the entire surface of the display by the external UV light. To prevent this emission, the UV filter is employed as a component in order to block the emission from external light. As described above, the UV filter uses a chemical or physical blocking agent to suppress degradation of the contrast ratio due to external light.

Although the present invention has been described with reference to a TFT active matrix LCD, the present invention is not limited thereto. According to another exemplary embodiment of the present invention, a simple matrix LCD without any switching element may be used.

The PL LCD according to the present invention includes QDs, which improve the light utilization efficiency, in red luminescent materials such that the light emission intensity of the red luminescent materials, which emit light of weaker intensity than other color light, increases, thereby improving the color balance. Furthermore, the LCD includes a UV filter blocking external UV light to suppress the degradation in contrast ratio, thereby providing a high quality image.

While the present invention has been particularly shown and described with reference to exemplary embodiments thereof, the present invention should not be construed as being limited to the exemplary embodiments set forth herein; rather, these exemplary embodiments are provided so that this disclosure will be thorough and complete, and will fully convey the concept of the present invention to those skilled in the art. It will be understood by those of ordinary skill in the art that various changes in structure and arrangement may be made therein without departing from the spirit and scope of the present invention as defined by the following claims.

What is claimed is:

1. A photo-luminescent liquid crystal display (PC LCD) comprising:
   a UV backlight unit generating ultraviolet (UV) light;
   a light control unit which includes a liquid crystal (LC) layer modulating the UV light and electrodes driving the LC layer; and
   a light emitting layer which emits light by the UV light transmitted through the light control unit, the light emitting layer includes inorganic phosphors and semiconductor quantum dots (QDs) having a quantum confinement effect.

2. The PC LCD of claim 1, wherein the light control unit comprises a plurality of pixel regions,
   wherein the light emitting layer comprises light emitting layer units corresponding to each of the pixel regions.

3. The PC LCD of claim 2, wherein the light emitting layer units comprise green light emitting layers, red light emitting layers and blue light emitting layers corresponding to each of the pixel regions, and the red light emitting layers comprise the QDs.

4. The PC LCD of claim 3, wherein the green light emitting layer comprises at least one phosphor selected from the group consisting of $YBO_3:Ce^{3+},Tb^{3+}$; $BaMgAl_{10}O_{17}:Eu^{2+},Mn^{2+}$; $(Sr,Ca,Ba)(Al,Ga)_2S_4:Eu^{2+}$; $ZnS:Cu,Al$; $Ca_8Mg(SiO_4)_4Cl_2:Eu^{2+},Mn^{2+}$; $Ba_2SiO_4:Eu^{2+}$; $(Ba,Sr)_2SiO_4:Eu^{2+}$; $Ba_2(Mg,Zn)Si_2O_7:Eu^{2+}$; and $(Ba,Sr)Al_2O_4$: $Eu^{2+}$; $Sr_2Si_3O_{8.2}SrCl_2:Eu^{2+}$,
   wherein the blue light emitting layer comprises at least one phosphor selected from the group consisting of $(Sr,Mg,Ca)_{10}(PO_4)_6Cl_2:Eu^{2+}$; $BaMgAl_{10}O_{17}:Eu^{2+}$; and $BaMg_2Al_{16}O_{27}:Eu^{2+}$, and
   wherein the red light emitting layer comprises at least one phosphor selected from the group consisting of $(Sr,Ca,Ba,Mg)P_2O_7:Eu^{2+},Mn^{2+}$; $CaLa_2S_4:Ce^{3+}$; $SrY_2S_4:Eu^{2+}$; $(Ca,Sr)S:Eu^{2+}$; $SrS:Eu^{2+}$; $Y_2O_3:Eu^{3+},Bi^{3+}$; $YVO_4:Eu^{3+}, Bi^{3+}$; $Y_2O_2S:Eu^{3+},Bi^{3+}$; and $Y_2O_2S:Eu^{3+}$.

5. The PC LCD of claim 3, wherein the red light emitting layer has a stacked structure of a separate red phosphor layer and a QD layer, and the QD layer is disposed closer to the UV backlight unit than the phosphor layer.

6. The PC LCD of claim 5, further comprising:
   a front plate and a rear plate having the LC layer therebetween,
   wherein the light emitting layer is disposed between the front plate and the LC layer.

7. The PC LCD of claim 5, further comprising:
   a front plate and a rear plate having the LC layer therebetween,
   wherein the light emitting layer is disposed on an outer surface of the front plate.

8. The PC LCD of claim 7, further comprising:
   a protection substrate formed on the light emitting layer; and
   a UV filter disposed on the protection substrate, the UV filter blocks external UV light.

9. The PC LCD of claim 8, wherein the UV filter comprises a chemical blocking agent absorbing UV light or a physical blocking agent reflecting and scattering incident UV light.

10. The PC LCD of claim 5, further comprising:
    an UV filter blocking external UV light.

11. The PC LCD of claim 10, wherein the UV filter comprises a chemical blocking agent absorbing UV light or a physical blocking agent reflecting and scattering incident UV light.

12. The PC LCD of claim 1, wherein the QDs are mixed with phosphors.

13. The PC LCD of claim 1, wherein the QDs are formed as a thin film under phosphor layers.

14. The PC LCD of claim 1, wherein the QD is selected from the group consisting of a II-IV compound, a III-IV compound, a IV-VI compound, a Group IV compound, and a mixture of the compounds.

15. The PC LCD of claim 14, wherein the II-VI compound is selected from the group consisting of CdSe, CdTe, ZnS, ZnSe, ZnTe, ZnO, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HggZnTe, CdZnSeS, CdZnSeTe, CdZnSTe, CdHgSeS, CdHgSeTe, CdHgSTe, HgZnSeS, HgZnSeTe and HgZnSTe,
    wherein the III-V compound is selected from the group consisting of GaN, GaP, GaAs, GaSb, AlN, AlP, AlAs, AlSb, InN, InP, InAs, InSb, GaNP, GaNAs, GaNSb, GaPAs, GaPSb, AlNP, AlNAs, AlNSb, AlPAs, AlPSb, InNP, InNAs, InNSb, InPAs, InPSb, GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs and InAlPSb,
    wherein the IV-VI compound is selected from the group consisting of SnS, SnSe, SnTe, PbS, PbSe, PbTe, SnSeS, SnSeTe, SnSTe, PbSeS, PbSeTe, PbSTe, SnPbS, SnPbSe, SnPbTe, SnPbSSe, SnPbSeTe and SnPbSTe, and
    wherein the Group IV compound is selected from the group consisting of Si, Ge, SiC and SiGe.

16. The PC LCD of claim 1, further comprising:
    a UV filter which is formed of one material selected from the group consisting of para-aminobenzoic acid (PABA) derivatives, cinnamate derivatives, salicylic acid derivatives, benzophenone and its derivatives, and antharanilate and its derivatives, wherein the UV filter blocks external UV light.

17. The PC LCD of claim 1, further comprising:
    a UV filter which is formed of one material selected from the group consisting of zinc oxide, titanium oxide, iron oxide and magnesium oxide, wherein the UV filter blocks external UV light.

* * * * *